US008103425B2

(12) United States Patent
Choi et al.

(10) Patent No.: US 8,103,425 B2
(45) Date of Patent: Jan. 24, 2012

(54) SIMULATION-BASED CONTROL FOR HCCI POWER SYSTEMS (75) Inventors: Cathy Y. Choi, Peterborough (GB); Stephen A. Faulkner, Stamford (GB); Mary Lou Kesse, Peoria, IL (US)

(73) Assignee: Perkins Engines Company Limited, Peterborough (GB)

( * ) Notice: Subject to any disclaimer, the term of this patent is extended or adjusted under 35 U.S.C. 154(b) by 917 days.

(21) Appl. No.: 11/642,744

(22) Filed: Dec. 21, 2006

(65) Prior Publication Data
US 2007/0162216 A1   Jul. 12, 2007

Related U.S. Application Data (60) Provisional application No. 60/752,882, filed on Dec. 23, 2005.

(51) Int. Cl.
*F02D 41/26* (2006.01)

(52) U.S. Cl. ........ 701/105; 701/108; 701/109; 701/110; 701/111; 123/435; 123/436; 123/480; 123/672

(58) Field of Classification Search .................. 123/295, 123/435, 436, 419, 492–493, 672, 479, 480; 701/101, 103–105, 108–110, 111; 60/274, 60/285, 286
See application file for complete search history.

(56) References Cited

U.S. PATENT DOCUMENTS

| 6,953,024 | B2 | | 10/2005 | Linna et al. | |
|---|---|---|---|---|---|
| 7,016,779 | B2 | * | 3/2006 | Bowyer | 701/108 |
| 7,274,986 | B1 | * | 9/2007 | Petridis et al. | 701/102 |
| 7,389,773 | B2 | * | 6/2008 | Stewart et al. | 123/672 |
| 7,596,446 | B1 | * | 9/2009 | Sakayanagi et al. | 701/105 |
| 7,614,384 | B2 | * | 11/2009 | Livshiz et al. | 123/399 |
| 7,813,869 | B2 | * | 10/2010 | Grichnik et al. | 701/114 |
| 7,878,178 | B2 | * | 2/2011 | Stewart et al. | 123/436 |
| 2002/0073957 | A1 | | 6/2002 | Urushihara et al. | |
| 2002/0078918 | A1 | | 6/2002 | Ancimer et al. | |
| 2003/0145836 | A1 | * | 8/2003 | Linna et al. | 123/501 |
| 2004/0182359 | A1 | | 9/2004 | Stewart et al. | |

FOREIGN PATENT DOCUMENTS

| WO | WO 03/065135 | | 8/2003 |
|---|---|---|---|
| WO | WO 03/065135 | A1 | 8/2003 |

* cited by examiner

*Primary Examiner* — Hai Huynh (57) ABSTRACT

A method of controlling an HCCI engine-based power system may include receiving performance information relating to a desired operating state for the HCCI engine-based power system, evaluating operational information associated with a current operating state of the HCCI engine-based power system, and determining one or more control parameter values based on the performance information and the operational information. The method may further include predicting a response of the HCCI engine-based power system based on the one or more control parameter values and determining whether the response satisfies one or more desired performance characteristics associated with the HCCI engine-based power system. If the response satisfies the one or more desired performance characteristics, control of at least one component of the HCCI engine-based power system may be enabled based on the one or more control parameter values. Further, if the predicted response does not satisfy the one or more desired performance characteristics, the method may include varying the one or more control parameter values to provide an updated set of control parameters and implementing the updated set of control parameters to control the at least one component of the HCCI engine-based power system.

57 Claims, 3 Drawing Sheets

SIMULATION-BASED CONTROL FOR HCCI POWER SYSTEMS

This application is based on and claims benefit of priority to U.S. Provisional Patent Application No. 60/752,882, filed Dec. 23, 2005, to Choi et al. and entitled "Simulation-Based Control for HCCI Power Systems."

TECHNICAL FIELD

This application relates generally to power system controls, and more particularly to simulation-based control of a homogeneous charge compression ignition (HCCI) engine-based power system.

BACKGROUND

Internal combustion engines, including diesel engines, gasoline engines, natural gas engines, and other engines known in the art, may exhaust a complex mixture of air pollutants. The air pollutants may be composed of both particulate matter and gaseous compounds, such as NOx.

Due to increased attention on the environment, exhaust emission standards have become more stringent, and the amount of particulate matter and/or NOx emitted into the atmosphere from an engine may be regulated depending on the type of engine, size of engine, and/or class of engine. In response to these increasingly stringent regulations, engine manufacturers have been investigating various technologies for reducing the emissions from engines. One such technology for potentially providing reduced emissions includes the use of an HCCI engine.

In a typical diesel engine, the combustion process is initiated by the direct injection of fuel into an environment of highly compressed air within a combustion chamber. The fuel ignites almost instantaneously upon contact with the compressed air, and produces a diffusion flame or flame front extending along the plumes of the injected fuel. With this type of combustion process, relatively hot and relatively cool regions can coexist within the combusting fuel. This variation in combustion temperature can contribute to the production of undesirable emissions products. For example, nitrogen oxides may be formed in the hot peripheral zones while soot may be formed in the cooler areas.

Combustion in an HCCI engine, on the other hand, takes place spontaneously and homogeneously without flame propagation. In the HCCI engine, fuel is homogeneously premixed with air, but with a high ratio of air to fuel. For example, an injection system may inject into a combustion chamber a metered dose of fuel. During the ensuing moments, fuel and air throughout the combustion chamber have time to mix, forming a nearly uniform mixture. As the piston nears top dead center (TDC) of the compression stroke, compression heating of the piston within the cylinder causes this mixture to auto-ignite (spontaneously combust). The resulting spontaneous burn produces a flameless energy release in a large zone almost simultaneously.

In this type of combustion, there is no flame front and a substantially homogeneous temperature exists throughout the combustion chamber. As a result, less NOx and particulate matter emissions are produced, as compared to a typical spark ignited or diesel engine.

One challenge associated with HCCI engines relates to combustion timing control. Particularly, specific quantities of fuel and air in the combustion chamber must be precisely maintained in order to ensure auto-ignition at intended times. Supplying appropriate amounts of fuel and air to the combustion chamber and maintaining a desired combustion timing become especially challenging under changing engine operating conditions. Unlike traditional engines whose combustion timing can be controlled by varying the initial conditions of a combustion event (e.g., injection amount, injection timing, etc.), the combustion event in an HCCI engine depends on both the initial conditions and the ongoing conditions in the combustion chamber. To provide a desired combustion timing, in response to an operator changing the position of an accelerator, for example, the HCCI power system must ascertain initial cylinder conditions and then estimate temperature later in the cycle based on measured cylinder pressures. Any inaccuracy in this predictive element can lead to transient control problems in an HCCI engine.

To improve the operating characteristics of an HCCI engine-based power system, especially under transient operating conditions, there exists a need for a more accurate predictive methodology. For example, the capability to accurately model the characteristics of a future combustion event may enable an HCCI engine control system to maximize the probability that the combustion event occurring in the next engine cycle meets a desired set of performance characteristics.

At least one predictive control system has been developed in an attempt to accurately control the operation of an engine subject to transient changes of target outputs. Specifically, international patent publication no. WO 03/065135 ("the '135 publication") discloses a control system in which a predictive model is employed to predict the outputs of the system in response to candidate new values for the inputs of the system. Based on the predicted response, the control system of the '135 publication determines inputs to the system that will cause the system outputs to match the target outputs as closely as possible.

While the system of the '135 patent may be capable of selecting an optimum candidate set of inputs based on a predictive model, the system of the '135 patent includes several shortcomings. For example, the system of the '135 patent relies exclusively upon predictive models (e.g., lookup tables including experimentally obtained data) that use interpolation to generate candidate sets of input values. This technique may be incapable of providing a desired level of accuracy under all conditions. Further, the system of the '135 publication is specifically aimed at the operation of exhaust gas recirculation (EGR) systems in traditional diesel engines including variable geometry turbochargers. The control system of the '135 patent may be unsuitable for providing the predictive capability necessary for operating an HCCI engine-based power system.

The presently disclosed systems and methods are directed to overcoming one or more of the problems set forth above.

SUMMARY OF THE INVENTION

In accordance with one aspect, the present disclosure is directed toward a method of controlling an HCCI engine-based power system. The method may include receiving performance information relating to a desired operating state for the HCCI engine-based power system, evaluating operational information associated with a current operating state of the HCCI engine-based power system, and determining one or more control parameter values based on the performance information and the operational information. The method may further include predicting a response of the HCCI engine-based power system based on the one or more control parameter values and determining whether the response satisfies one or more desired performance characteristics associated with the HCCI engine-based power system. If the response satisfies the one or more desired performance characteristics, control of at least one component of the HCCI engine-based power system may be enabled based on the one or more control parameter values. Further, if the predicted response does not satisfy the one or more desired performance characteristics, the method may include varying the one or more control parameter values to provide an updated set of control parameters and implementing the updated set of control parameters to control the at least one component of the HCCI engine-based power system.

According to another aspect, the present disclosure is directed toward a control system for controlling an HCCI engine based power system. The control system may include a memory including instructions for receiving performance information relating to a desired operating state for the HCCI engine-based power system, evaluating operational information associated with a current operating state of the HCCI engine-based power system, and determining one or more control parameter values based on the performance information and the operational information. The memory may also include instructions for predicting a response of the HCCI engine-based power system based on the one or more control parameter values and determining whether the response satisfies one or more desired performance characteristics associated with the HCCI engine-based power system. Control of at least one component of the HCCI engine-based power system may be enabled based on the one or more control parameter values if the response satisfies the one or more desired performance characteristics. If the predicted response does not satisfy the one or more desired performance characteristics, the one or more control parameter values may be varied to provide an updated set of control parameters, and the updated set of control parameters may be implemented to control the at least one component of the HCCI engine-based power system. The control system may also include a processor configured to execute the instructions.

In accordance with yet another aspect, the present disclosure includes a work machine including an HCCI engine based power system. The work machine may also include a memory including instructions for receiving performance information relating to a desired operating state for the HCCI engine-based power system, evaluating operational information associated with a current operating state of the HCCI engine-based power system, and determining one or more control parameter values based on the performance information and the operational information. The memory may also include instructions for predicting a response of the HCCI engine-based power system based on the one or more control parameter values and determining whether the response satisfies one or more desired performance characteristics associated with the HCCI engine-based power system. Control of at least one component of the HCCI engine-based power system may be enabled based on the one or more control parameter values if the response satisfies the one or more desired performance characteristics. If the predicted response does not satisfy the one or more desired performance characteristics, the one or more control parameter values may be varied to provide an updated set of control parameters, and the updated set of control parameters may be implemented to control the at least one component of the HCCI engine-based power system. The work machine may also include a processor configured to execute the instructions.

DETAILED DESCRIPTION

Figure 1:
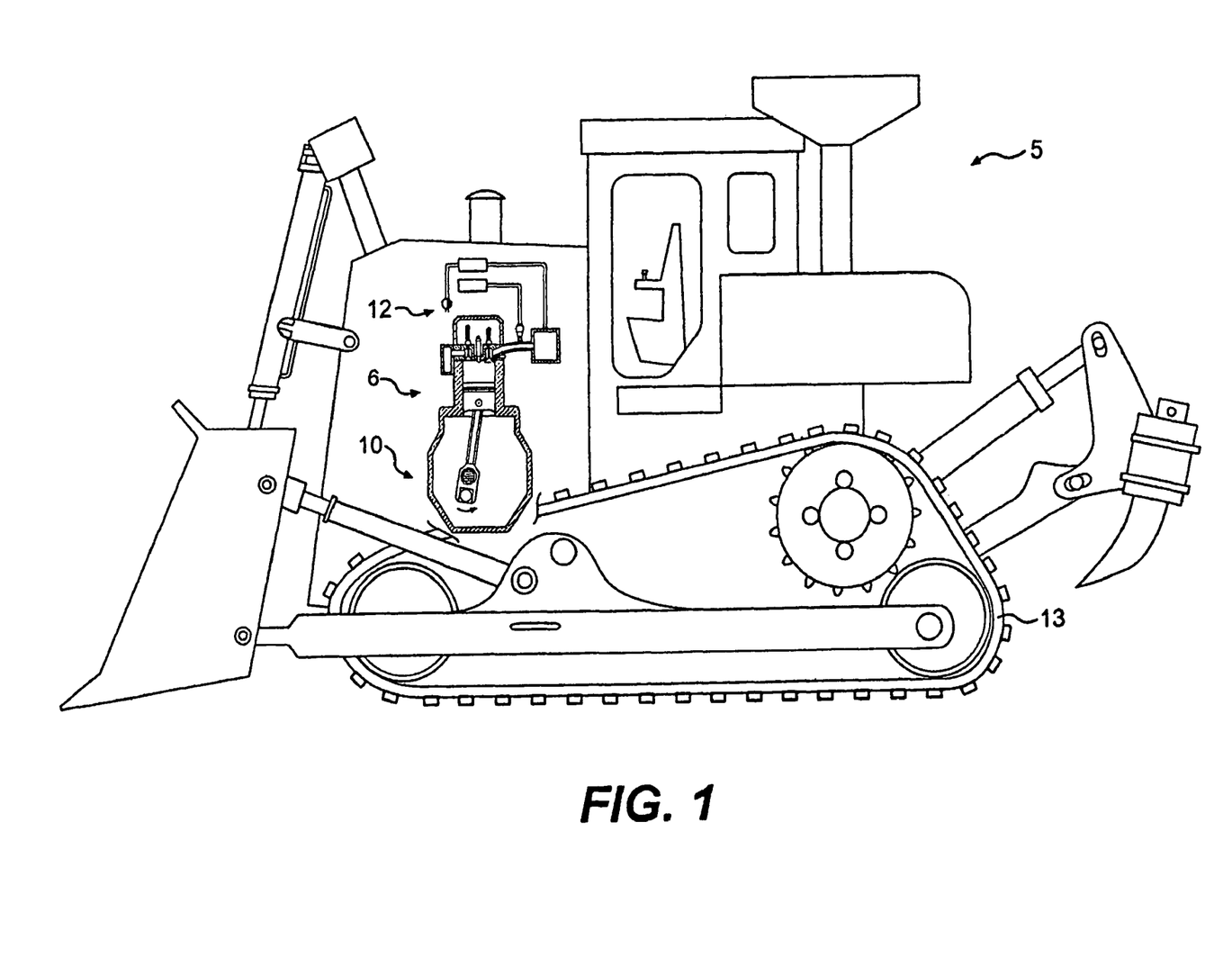
FIG. 1 provides diagrammatic illustration of a work machine, according to an exemplary disclosed embodiment.

FIG. 1 illustrates a work machine 5 having a homogeneous charge compression ignition (HCCI) engine-based power system 6. HCCI engine-based power system 6 may include a homogeneous charge compression ignition engine (HCCIE) 10 and a combustion control system (CCS) 12. Work machine 5 may be a fixed or mobile machine having a traction device 13. Work machine 5 may perform some type of operation associated with an industry such as mining, construction, farming, or any other industry known in the art. For example, work machine 5 may be an earth moving machine such as a dozer, a loader, a backhoe, an excavator, a motor grader, a dump truck, or any other earth moving machine. Work machine 5 may also include a generator set, a pump, a marine vessel, an aircraft, or any other suitable operation-performing work machine.

Figure 2:
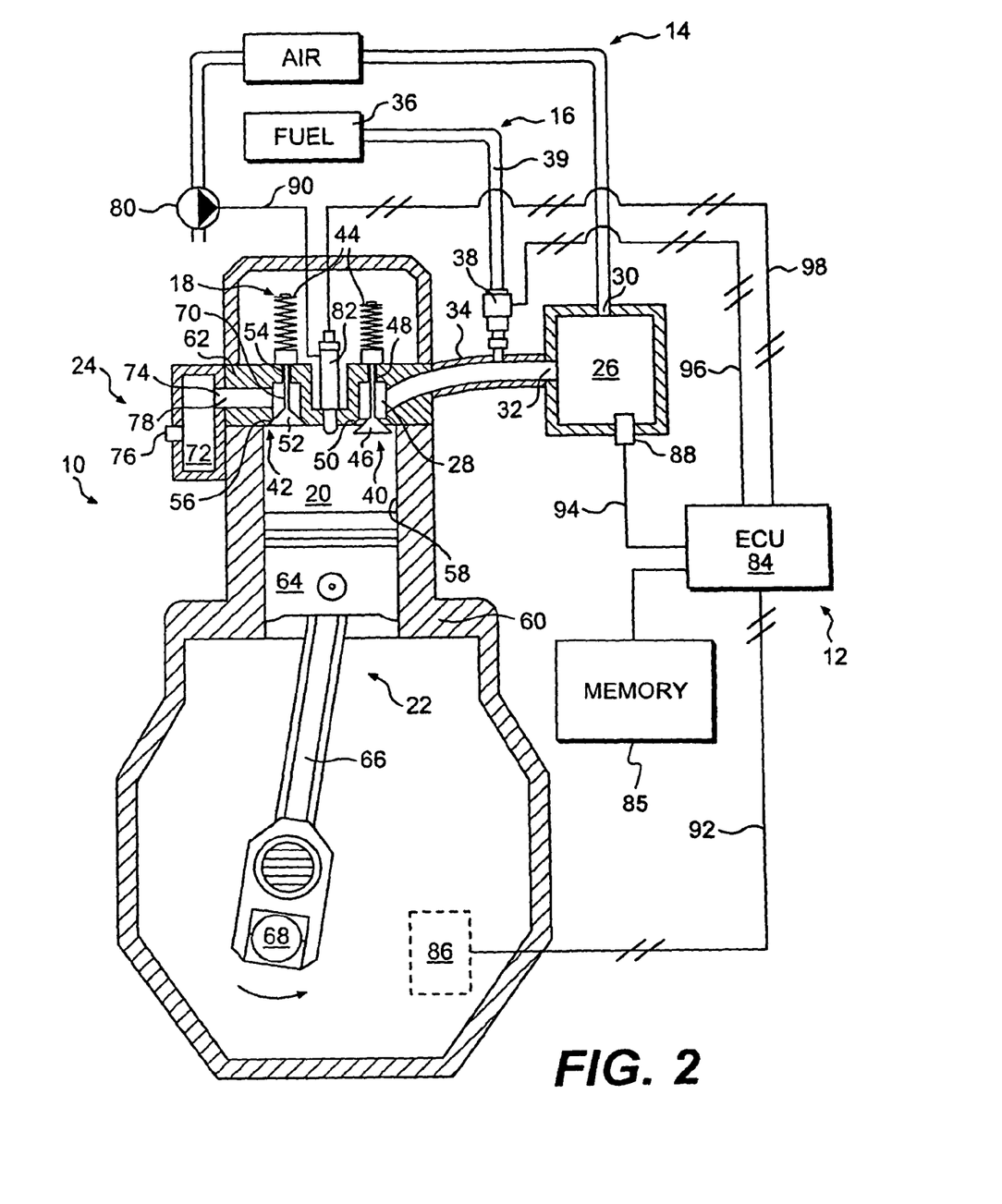
FIG. 2 provides a diagrammatic illustration of a homogeneous charge compression ignition power system having a control system, according to an exemplary disclosed embodiment.

HCCIE 10 may be configured to compress a substantially homogeneous mixture of fuel and air, which is then controllably auto-ignited to produce mechanical work and exhaust. As illustrated in FIG. 2, HCCIE 10 may include an air induction system 14, a fuel system 16, a valve actuation system 18, a plurality of combustion chambers 20 (only one shown), a piston assembly 22 disposed within each of combustion chambers 20, and an exhaust system 24.

Air induction system 14 may be configured to draw air into HCCIE 10 and may include an intake manifold 26 and an inlet port 28. It is contemplated that air induction system 14 may be a charged air system having a turbine-driven or engine-driven compressor (not shown), or may include additional air handling components such as, for example, a waste gate, a throttle, an EGR system, an air cleaner, an air cooler, or any other air handling component known in the art.

Intake manifold 26 may be configured to distribute air to each of combustion chambers 20 and may include an inlet 30 and an outlet 32. It is contemplated that multiple intake manifolds 26 may be included within HCCIE 10, each intake manifold 26 distributing air to separate banks of combustion chambers 20.

Inlet port 28 may be connected to intake manifold 26 via a fluid passageway 34 and configured to fluidly communicate the air from intake manifold 26 with valve actuation system 18 associated with each combustion chamber 20. It is contemplated that multiple inlet ports 28 may be associated with each combustion chamber 20.

Fuel system 16 may be configured to supply fuel to HCCIE 10 and may include a source of pressurized fuel 36 and a valve 38. It is contemplated that additional components may be included such as for example, a common fuel rail configured to distribute fuel to multiple valves 38, a fuel injector, a pre-combustion chamber, or any other fuel system component known in the art.

The source of pressurized fuel 36 may include a compressed gaseous fuel such as, for example, natural gas, propane, bio-gas, landfill gas, or hydrogen gas. It is also contemplated that the source of pressurized fuel 36 may be a pump configured to pressurize a liquid fuel such as, for example, gasoline, methanol, ethanol, or any other gaseous or liquid fuel having a substantially high octane number and a substantially low cetane number.

Valve 38 may be connected to the source of pressurized fuel 36 via a fluid passageway 39 and to fluid passageway 34 to control the amount of fuel communicated from the source of pressurized fuel to fluid passageway 34. Valve 38 may be a spool valve, a shutter valve, a butterfly valve, a check valve, a diaphragm valve, a gate valve, a shuttle valve, a ball valve, a globe valve, or any other valve known in the art. Valve 38 may be solenoid-actuated hydraulically-actuated, pneumatically-actuated, or actuated in any other manner. In particular, valve 38 may be movable between a first position where fuel flows into fluid passageway 34 and a second position where fuel is blocked from fluid passageway 34.

The amount of fuel allowed into fluid passageway 34 by valve 38 can control the ratio of fuel to air introduced into combustion chamber 20. Specifically, if it is desired to introduce a lean mixture of fuel and air (mixture having a relatively low amount of fuel compared to the amount of air) into combustion chamber 20, valve 38 may remain in the first position for a shorter period of time than if a rich mixture of fuel and air (mixture having a relatively large amount of fuel compared to the amount of air) is desired. Likewise, if a rich mixture of fuel and air is desired, valve 38 may remain in the first position for a longer period of time than if a lean mixture is desired. It is contemplated that valve 38 may be omitted, if desired, and a fuel injector included.

Valve actuation system 18 may be configured to meter fuel and air into and allow exhaust out of combustion chamber 20 and may include at least one intake valve 40, at least one exhaust valve 42, and a return spring 44 associated with each of intake valve 40 and exhaust valve 42. Additional components may be included within valve actuation system 18 such as, for example, a valve actuator (not shown), additional intake valves 40 associated with each combustion chamber 20, additional exhaust valves 42 associated with each combustion chamber 20, a bridge interconnecting the intake valves 40 or exhaust valves 42 of each combustion chamber, and other components known in the art. The valve actuator may embody any means for actuating intake valve 40 or exhaust valve 42 such as, for example, a cam/push-rod/rocker arm assembly, a solenoid actuator, a hydraulic actuator, or any other means for actuating known in the art.

Intake valve 40 may selectively fluidly communicate inlet port 28 with combustion chamber 20 and may include a valve member 46, a stem 48 connecting valve member 46 to the valve actuator, and a seat 50. In particular, valve member 46 may be movable between a first position where fuel and air flows into combustion chamber 20 and a second position where valve member 46 engages seat 50 to block fuel and air from combustion chamber 20.

Exhaust valve 42 may selectively fluidly communication exhaust system 24 with combustion chamber 20 to selectively allow exhaust to flow from combustion chamber 20 into exhaust system 24, and may include a valve member 52, a stem 54 connecting valve member 52 to the valve actuator, and a seat 56. In particular, valve member 52 may be movable between a first position where the exhaust flows out of combustion chamber 20 and a second position where valve member 52 engages seat 56 to block exhaust from exiting combustion chamber 20.

Return spring 44 may be configured to bias intake and exhaust valves 40, 42 toward their respective second positions. In particular, return spring 44 may be operably connected to each of intake valves 40 and exhaust valves 42 by means of a retaining member (not shown) connected to stems 48 and 54. As intake or exhaust valves 40, 42 move toward their first position, return spring 44 may compress against a surface of combustion chamber 20 and urge the respective valve to the second position. It is contemplated that different return springs may be implemented for intake valve 40 as compared to exhaust valve 42. It is further contemplated that return spring 44 may be omitted, if desired, and another means may be implemented for biasing intake valve 40 and exhaust valve 42 to the second position.

Combustion chamber 20 may be configured to receive fuel and air from fuel system 16 and air induction system 14, to house the combustion process, and to direct exhaust resulting from the combustion process to exhaust system 24. Combustion chamber 20 may include a cylinder bore 58 formed within an engine block 60, and a cylinder head 62 connected to engine block 60. It is contemplated that additional components may be included within combustion chamber 20 such as, for example, a cooling chamber (not shown) disposed between cylinder bore 58 and engine block 60, a cylinder liner (not shown) disposed within cylinder bore 58, a means (not shown) for sealing cylinder head 62 to engine block 60, and other combustion chamber components known in the art.

Piston assembly 22 may be slidably disposed with cylinder bore 58 and configured to reciprocate between a bottom-dead-center (BDC) position, or lower-most position within combustion chamber 20, and a top-dead-center (TDC) position, or upper-most position within combustion chamber 20. In particular, piston assembly 22 may include a piston 64 and a connecting rod 66 that connects piston assembly 22 to a crankshaft 68 of HCCIE 10. As crankshaft 68 rotates 180 degrees, piston 64 and linked connecting rod 66 move through one full stroke between BDC and TDC. HCCIE 10 may be a four stroke engine, wherein a complete cycle includes an intake stroke (TDC to BDC), a compression stroke (BDC to TDC), a power stroke (TDC to BDC), and an exhaust stroke (BDC to TDC). It is also contemplated that HCCIE 10 may alternately be a two stroke engine, wherein a complete cycle includes a compression/exhaust stroke (BDC to TDC) and a power/exhaust/intake stroke (TDC to BDC).

Exhaust system 24 may be configured to direct exhaust from combustion chamber 20 to the atmosphere and may include an exhaust port 70 and an exhaust manifold 72. It is contemplated that exhaust system 24 may include other components such as, for example, a turbine, an exhaust gas recirculation system, a particulate filter, a catalytic aftertreatment system, or any other exhaust system component known in the art.

Exhaust manifold 72 may be configured to collect exhaust from each of combustion chambers 20 and to direct the exhaust to the atmosphere. Exhaust manifold 72 may include an inlet 74 and an outlet 76. It is contemplated that multiple exhaust manifolds 72 may be included within HCCIE 10, each exhaust manifold 72 collecting exhaust from separate banks of combustion chambers 20.

Exhaust port 70 may be connected to exhaust manifold 72 via a fluid passageway 78 and configured to fluidly communicate the exhaust from exhaust valve 42, associated with each combustion chamber 20, with exhaust manifold 72. It is contemplated that multiple exhaust ports 70 may be associated with each combustion chamber 20.

CCS 12 may be configured to control combustion timing of a substantially homogeneous mixture of fuel and air compressed by HCCIE 10 and may include a source of pressurized gas 80, an injector 82, an electronic control unit (ECU) 84, a memory 85, a crank angle sensor 86, and a intake manifold sensor 88. It is contemplated that additional components may be included within CCS 12 such as, for example, additional engine sensors.

ECU 84 may be in communication with crank angle sensor 86 via communication line 92, with intake manifold sensor 88 via communication line 94, and with valve 38 via communication line 96, to control operations of valve 38 in response to signals from crank angle sensor 86 and intake manifold sensor 88. Crank angle sensor 86 may be disposed proximal to crankshaft 68 and configured to measure an instantaneous angular position of crankshaft 68 and to generate a signal corresponding to the measured crank angle. Intake manifold sensor 88 may be disposed within intake manifold 26 and configured to measure an instantaneous pressure and/or temperature within intake manifold 26 and to generate a pressure signal and/or a temperature signal in response thereto. It is contemplated that a greater or lesser number of sensors may be included within CCS 12 and that intake manifold sensor 88 may be omitted, if desired. It is further contemplated that intake manifold sensor 88 may alternately be located within combustion chamber 20 to measure a pressure and/or temperature of the fluid within combustion chamber 20.

ECU 84 may include one or more processing devices configured to execute instructions for controlling any or all aspects of HCCI engine-based system 6. These instructions may be stored, for example, in a memory 85.

Memory 85 may include any type of storage media suitable for storing data and/or machine instructions. For example, memory 85 may include a hard disk, RAM, ROM, optical disks (e.g., CD-ROM disks, DVDs, etc.), flash memory, etc.

INDUSTRIAL APPLICABILITY

The disclosed control system may be applicable to any engine-based or combustion power system where precise control over combustion initiation and other operational aspects may be desired. In one exemplary embodiment, the disclosed control system may be applicable to any HCCI engine-based power system. The operation of CCS 12 and HCCIE 10 will now be explained.

During an intake stroke of HCCIE 10, as piston 64 is moving within combustion chamber 20 between the TDC position and the BDC position, intake valve 40 may be in the first position, as shown in FIG. 1. During the intake stroke, the downward movement of piston 64 towards the BDC position may create a low pressure within combustion chamber 20. The low pressure may act to draw fuel and air from fluid passageway 34 into combustion chamber 20 via inlet port 28. As described above, a turbocharger may alternately be used to force compressed air and fuel into combustion chamber 20. The fuel may be introduced into the air stream either from or to the turbo charger or, alternately, may be provided directly into combustion chamber 20.

Following the intake stroke, both intake valve 40 and exhaust valve 42 may be in the second position where the fuel and air mixture are blocked from exiting combustion chamber 20 during the upward compression stroke of piston 64. As the piston moves upward from the BDC position towards the TDC position during the compression stroke, the fuel and air mixture within combustion chamber 20 may be homogeneously mixed and compressed. At a time during the compression stroke, the pressure and/or temperature of the homogenous fuel and air mixture within combustion chamber 20 increases to the auto-ignition threshold of the homogeneous fuel and air mixture. In one embodiment, auto-ignition may be established just after TDC when piston 64 is moving downward during the power stroke. It is also contemplated that auto-ignition may occur just prior to TDC when piston 64 is completing the compression stroke.

Figure 3:
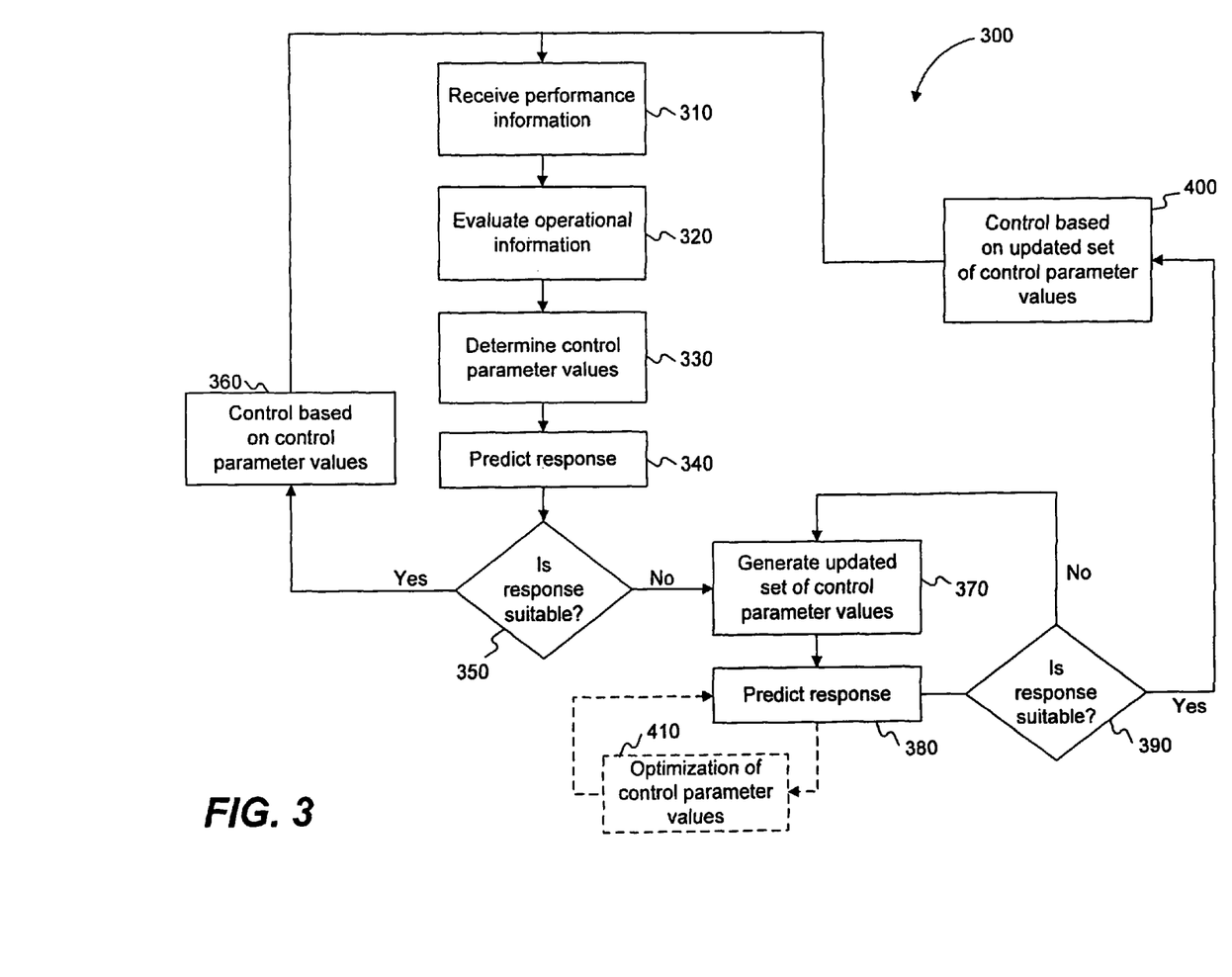
FIG. 3 provides a flowchart representing a method of controlling a homogeneous charge compression ignition power system, according to an exemplary disclosed embodiment.

FIG. 3 provides a flowchart 300 representing an exemplary method of controlling HCCI engine-based power system 6, according to an exemplary disclosed embodiment. For example, at step 310, ECU 84 may determine, based on received performance information, a desired operating state for HCCI engine-based power system 6. This performance information may be provided by an operator of work machine 5 and may relate to various performance characteristics the operator desires of work machine 5. For example, the operator may adjust the position of a throttle associated with work machine 5. Based on the modified position of the throttle, ECU 84 may determine that the operator wishes to adjust the operating speed of HCCIE 10, for example. ECU 84 may account for this performance information when determining appropriate control values for meeting the desired performance levels requested by the operator.

At step 320, ECU 84 may evaluate operational information associated with a current state of HCCIE 10. This operational information may include any sensed or calculated values associated with an operational aspect of HCCIE 10. For example, operational information may include a quantity of fuel for metering, a combustion chamber pressure level, crank angle, a fuel metering timing value, an air to fuel ratio, an air pressure level, a fuel pressure level, an oxygen level, engine speed, torque, an engine load, emissions levels, or any other quantity that ECU 84 may rely upon to characterize the operational characteristics of HCCIE 10.

Using both the performance information indicative of a desired operational state of HCCIE 10 and the operational information indicative of a current operating state of HCCIE 10, ECU 84 may generate a set of control parameter values (step 330). These values may relate to various controllable settings associated with HCCIE 10 (e.g., control timing values associated with valve 38 to control the ratio of fuel to air introduced into combustion chamber 20, control values associated with intake valve 40 and exhaust valve 42, and any other suitable control settings). Further these values may correspond to an initial set of values determined by ECU 84 to provide the most likelihood of providing the desired response in HCCIE 10. This initial set of control parameters may be generated, for example, using lookup tables based on empirical data relating the performance characteristics of HCCIE 10 with various input values. Additionally, these values may be determined by any other suitable method.

Combustion in an HCCI engine, as previously described, depends not only on the initial conditions determined and implemented by ECU 84, but also on the ongoing conditions within the combustion chamber (e.g., pressure, temperature, air to fuel ratio, etc.). As a result, there may be some discrepancy between the actual performance response of HCCIE 10 and the intended response expected based on the initial set of control parameter values. Such discrepancies can lead to unintended or undesirable operational characteristics especially during periods marked by transient operating conditions. To more closely provide the intended operational characteristics of HCCIE 10, ECU 84 may be configured to run a predictive element to model the characteristics of, for example, a future combustion event associated with HCCIE 10 (or any other operational aspect of HCCI engine-based power system 6). This predictive element may increase the likelihood that a selected set of control values actually produces the desired operational characteristics.

More specifically, at step 340, ECU 84 predicts a response of the HCCI engine-based power system based on the control parameter values. In one embodiment, this prediction step may include running a simulation routine configured to model operational characteristics associated with at least one component of the HCCI engine-based power system. For example, the simulation may be configured to model a combustion process expected to occur within combustion chamber 20 during the next or subsequent cycles of HCCIE 10. Additionally or alternatively, the simulation may be configured to model any other process associated with HCCI engine-based power system 6.

In one embodiment, the simulation routine may include a predictive model. This type of model may operate as a "black box" designed to provide a set of output values based on a set of variable input values. Rather than simulating the actual physical processes occurring within a system, these predictive models may be built upon empirical data and configured to mimic an observed set of response characteristics. That is, through bench testing, for example, an array of input values may be provided to a system, and the response of the system can be measured and documented. Using this information, a predictive model can be generated to mimic the performance of the actual system. When supplied with a particular set of input values, for example, the predictive model may return one or more output values similar to those produced by the actual system under the same input conditions.

As an example, to develop a predictive model of HCCIE 10, or other aspects of HCCI engine-based power system 6, a prototype of HCCIE 10 can be subjected to bench testing to observe a range of operational characteristics of HCCIE 10. For example, various control inputs to HCCIE 10 (e.g., an air to fuel ratio, fuel metering timing, pressure in combustion chamber, etc.) can be varied, and the corresponding operational characteristics of HCCIE 10 (e.g., power output, emissions levels, etc.) may be observed and recorded. These observations may serve as the basis for lookup tables of data that correlate various input control parameter values with an expected set of output characteristics. In addition to lookup tables, one or more equations that approximate aspects of the observed operational behavior can be develop for inclusion in the predictive model. These lookup tables, equations, and/or any other suitable predictive modeling tools may be used to provide the functionality of the predictive model. Particularly, a "black box" representation of HCCIE 10 may be provided such that upon receipt of a set of input control parameter values, the predictive model may return a set of outputs representative of the expected output characteristics of HCCIE 10. Ultimately, these outputs may be linked to the observed behavior of a bench tested prototype operated under the same or similar conditions.

Alternatively, the simulation routine may include a physical simulation model configured to simulate at least one operation associated with the HCCI engine-based power system. Such a physical simulation routine may be configured to model the actual physical behavior of the HCCI system. For example, rather than simply predicting a performance response based on observed behavior, as in a predictive simulation model, the physical simulation model may be configured to actually "understand" the physical processes occurring within or associated with the HCCI system. Thus, for a set of input conditions, the physical simulation model may run a simulation of one or more physical processes and calculate output values that would result from the input conditions. In some embodiments, the calculated output may change or provide the input conditions for a subsequent iteration of the physical simulation model.

As an illustrative example, ECU 84 may be configured to run a physical simulation of the HCCI combustion process expected to occur in combustion chamber 20. The physical simulation model, in this example, may be capable of calculating various characteristics associated with the combustion process (e.g., pressure in cylinder, temperature, time of burn, ignition time, etc.) based on various input information (e.g., cylinder dimensions, fuel pressure and type, temperature in cylinder, air to fuel ratio, etc.).

Compared to predictive type models, physical simulation models may be more computationally intensive and, therefore, may require more processing resources. On the other hand, physical simulation models may provide increased accuracy as compared to predictive models.

Various types of modeling techniques may be suitable for incorporation into a physical simulation model configured for execution by ECU 84. For example, these physical simulation models may include certain types of probability density function based stochastic reactor models to account for chemical kinetics within combustion chamber 20. Such chemical kinetics can be determinative in evaluating and modeling the combustion process in combustion chamber 20. These types of models may also account for any inhomogeneities in composition within the air/fuel mixture and/or temperature within combustion chamber 20. Additionally and/or alternatively, various types of 1-D or 3-D fluid dynamics models and heat transfer models may be incorporated into a physical simulation model. Further, coalescence-dispersion type models may be included to describe the turbulent mixing of air and fuel that may occur within combustion chamber 20. Other modeling alternatives will be apparent to those of ordinary skill in the art.

Through the use of physical simulation modeling techniques, and even, in certain embodiments, predictive models, ECU 84 may be able to accurately predict the system response associated with future combustion events or other operations of HCCI engine-based power system 6. For example, the system response may include in-cylinder temperatures, in-cylinder pressures, power output values, NOx emissions levels, particulate emissions levels, auto ignition times, combustion burn times, and any other characteristic associated with the operation of HCCI engine-based power system 6.

At step 350, ECU 84 may determine whether the simulated response satisfies one or more desired performance characteristics associated with the HCCI engine-based power system. For example, ECU 84 may determine whether a desired power output level would be achieved by operating HCCIE 10 using the selected control parameter values. Alternatively or additionally, ECU 84 may determine whether a desired emissions level for NOx and/or particulate matter would be achieved based on the selected control parameter values.

If ECU 84 determines at step 350 that the predicted response is suitable (i.e., the desired performance characteristics of the HCCI system would be achieved using the selected control parameter values), then operation of the HCCI system using those parameters is allowed to proceed at step 360. Before entering the next engine cycle (or upon entering the next engine cycle) operation of the control system returns to step 310.

If, however, ECU 84 determines at step 350 that the predicted response does not meet one or more desired performance characteristics, operation may proceed to step 370. At step 370, the selected control parameter values may be varied to provide an updated set of control parameters. The goal in generating this updated set of parameters may be to provide a set of control values that would more closely match or better satisfy a desired set of performance requirements.

These updated parameter values may be generated in a variety of ways. For example, a random number generator may be employed to randomly select a new control parameter value from among an allowed range of values. The allowed ranges may be predetermined based on a measured or calculated sensitivity of the modeled behavior to changes in each control parameter value. Alternatively, the updated parameter values may be provided simply by modifying the control parameter values according to a predetermined schedule.

At step 380, the simulation routine may again be run to predict the response of the HCCI system based on the updated set of control parameter values. If ECU 84 determines at step 390 that the predicted response is suitable (i.e., the desired performance characteristics of the HCCI system would be achieved using the selected control parameter values), then operation of the HCCI system using the updated set of parameters is allowed to proceed at step 400. Before entering the next engine cycle (or upon entering the next engine cycle) operation of the control system returns to step 310.

If, however, ECU 84 determines at step 390 that the predicted response does not meet one or more desired performance characteristics, operation returns to step 370, and, again, control parameter values may be varied to provide yet another updated set of control parameters. This process may continue until ECU 84 determines that the predicted response meets the desired performance characteristics or until some predetermined time window expires at which time ECU 84 goes forward and implements the best available control parameter values.

The control system may optionally include an optimization routine for optimizing a set of control parameter values. For example, at step 410, a set of updated control parameter values generated in step 370 may be optimized. Optimization of the control parameters may include ECU 84 may optionally implement an optimization routine at step 410 to obtain an optimized set of control parameter values. For purposes of this disclosure, an optimized value refers to any value determined to provide a more desirable output or response as compared to another value. This determination, however, is based on varying conditions and various different rules. A selected control parameter value under one set of conditions may represent an optimized value, while under a different set of conditions this value may provide a less desirable performance response. Further, there is no requirement that the optimized value be limited only to some particular value that provides a "best" response. The optimized value must merely exhibit a "better" response under a particular set of conditions or selection rules.

Running the optimization routine at step 410 may include predicting the response of the HCCI engine-based power system based on the updated set of control parameters and optimizing the one or more control parameter values by minimizing a predetermined cost function. Minimizing such a cost function may, ultimately, provide an optimized set of control parameter values, which may represent a "best available" (e.g., not a "theoretically/fundamentally best") set of input control values for supplying to the HCCI system. It should be noted that any other suitable optimization techniques may be used at step 410 to generate an "optimized" set of input control values.

At steps 360 and 400, control of HCCI system is allowed to proceed with a selected set of control parameters. In operation, these control parameters may determine, for example, the fuel to air ratio of the mixture within combustion chamber 20, the pressure within combustion chamber 20, and/or any other quantity associated with the operation of HCCI system 6. In particular, based on certain control parameter values, ECU 84 may move valve 38 between the first and second positions in response to one or more predetermined conditions. The predetermined conditions may be related to a temperature or pressure signal generated by intake manifold sensor 88 and/or to a signal generated by crank angle sensor 86. It is contemplated that additional engine parameters may be sensed and/or monitored and that CCS 12 may control valve 38 and/or injector 82 based on the additional engine parameters.

The simulation based control of HCCI engine-based power system 6 may occur during each cycle of HCCIE 10. Particularly, for every cycle of HCCIE 10, a selected set of input parameter control values may be evaluated, a simulation may be performed to predict the response of the system, and these control parameter values may be altered based on the results of the simulation. Assuming, for example, that the HCCIE 10 is operating at 1500 rpm, and every two rotations of HCCIE 10 corresponds to a complete cycle, the disclosed simulation based control process would occur 750 times per minute, or approximately every 0.08 seconds.

The disclosed control system may provide several advantages over other simulation based systems. For example, this system provides the capability to model the combustion behavior and predict the results associated with operation of an HCCI based power system. Further, the additional capability of simulating the actual physical processes associated with the operation of the HCCI based power system can provide a significant increase in the accuracy of the control system. As a result, the occurrence of an unexpected and/or undesirable response characteristic during the operation of the HCCI based power system can be minimized or avoided.

It will be apparent to those skilled in the art that various modifications and variations can be made to the disclosed HCCI control system without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method of controlling an engine-based power system, comprising:
    receiving performance information relating to a desired operating state for the engine-based power system;
    evaluating operational information associated with a current operating state of the engine-based power system;
    determining a single set of one or more control parameter values corresponding to a same time interval of power system operation, the single set of control parameter values based on the performance information and the operational information;
    predicting a response of the engine-based power system based on the single set of the one or more control parameter values; and
    determining whether the response predicted based on the single set of control parameter values satisfies one or more desired performance characteristics associated with the engine-based power system.

2. The method of claim 1, further including:
    enabling control of at least one component of the engine-based power system based on the one or more control parameter values if the response satisfies the one or more desired performance characteristics.

3. The method of claim 1, further including:
    if the predicted response does not satisfy the one or more desired performance characteristics, varying the one or more control parameter values to provide an updated set of control parameters and implementing the updated set of control parameters to control at least one component of the engine-based power system.

4. The method of claim 3, further including:
predicting the response of the engine-based power system based on the updated set of control parameters and modifying the one or more control parameter values by minimizing a predetermined cost function, using the one or more control parameters as inputs, to provide a modified set of control parameter values.

5. The method of claim 1, further including:
modifying at least one of the one or more control parameter values in response to the prediction.

6. The method of claim 5, further including:
controlling the engine-based power system in response to the modified control parameter.

7. The method of claim 1, wherein the one or more desired performance characteristics includes an emissions level associated with exhaust produced by the engine-based power system.

8. The method of claim 1, wherein the emissions level is related to an amount of particulate matter or an amount of NOx present in the exhaust.

9. The method of claim 1, wherein the one or more desired performance characteristics include a power output associated with the engine-based power system.

10. The method of claim 1, wherein the performance information relating to a desired operating state for the engine-based power system is related to an input to the engine-based power system provided by an operator.

11. The method of claim 1, wherein the operational information associated with a current operating state of the engine-based power system includes any of a quantity of fuel for metering, a combustion chamber pressure level, crank angle, a fuel metering timing value, an air to fuel ratio, an air pressure level, a fuel pressure level, and an oxygen level.

12. The method of claim 1, wherein the operational information associated with a current operating state of the engine-based power system includes an engine speed, a load on the engine-based power, a torque sensor output.

13. The method of claim 1, wherein the operational information associated with a current operating state of the engine-based power system includes at least one value associated with emissions generated by the engine-based power system.

14. The method of claim 1, wherein predicting a response of the engine-based power system includes running a simulation routine configured to model operational characteristics associated with at least one component of the engine-based power system.

15. The method of claim 14, wherein the simulation routine includes a predictive model.

16. The method of claim 14, wherein the simulation routine includes a physical simulation model configured to simulate at least one operation associated with the engine-based power system.

17. The method of claim 16, wherein the at least one operation includes combustion occurring within one or more combustion chambers of the engine-based power system.

18. The method of claim 16, wherein the at least one operation includes a flow of air through the engine-based power system.

19. The method of claim 16, wherein the at least one operation includes a generation of emissions from the engine-based power system.

20. The method of claim 1, wherein the engine-based power system is an HCCI engine-based power system.

21. The method of claim 1, further including substantially homogeneously mixing fuel with air prior to combustion.

22. A control system for controlling an engine-based power system, comprising:
a memory including instructions for:
receiving performance information relating to a desired operating state for the engine-based power system,
evaluating operational information associated with a current operating state of the engine-based power system,
determining a single set of one or more control parameter values corresponding to a same time interval of power system operation, the single set of control parameter values based on the performance information and the operational information,
predicting a response of the engine-based power system based on the single set of control parameter values, and
determining whether the response predicted based on the single set of control parameter values satisfies one or more desired performance characteristics associated with the engine-based power system; and
a processor configured to execute the instructions.

23. The control system of claim 22, further including instructions for enabling control of at least one component of the engine-based power system based on the one or more control parameter values if the response satisfies the one or more desired performance characteristics.

24. The control system of claim 22, further including instructions for varying the one or more control parameter values to provide an updated set of control parameters and implementing the updated set of control parameters to control at least one component of the engine-based power system if the predicted response does not satisfy the one or more desired performance characteristics.

25. The control system of claim 22, further including instructions for predicting the response of the engine-based power system based on the updated set of control parameters and modifying the one or more control parameter values by minimizing a predetermined cost function, using the one or more control parameters as inputs, to provide a modified set of control parameter values.

26. The control system of claim 22, further including modifying at least one of the one or more control parameter values in response to the prediction.

27. The control system of claim 22, further including controlling the engine-based power system in response to the modified control parameter.

28. The control system of claim 22, wherein the one or more desired performance characteristics includes an emissions level associated with exhaust produced by the engine-based power system.

29. The control system of claim 28, wherein the emissions level is related to an amount of particulate matter or an amount of NOx present in the exhaust.

30. The control system of claim 22, wherein the one or more desired performance characteristics include a power output associated with the engine-based power system.

31. The control system of claim 22, wherein the performance information relating to a desired operating state for the engine-based power system is related to an input to the engine-based power system provided by an operator.

32. The control system of claim 22, wherein the operational information associated with a current operating state of the engine-based power system includes any of a quantity of fuel for metering, a combustion chamber pressure level, crank angle, a fuel metering timing value, an air to fuel ratio, an air pressure level, a fuel pressure level, and an oxygen level.

33. The control system of claim 22, wherein the operational information associated with a current operating state of the engine-based power system includes an engine speed, a load on the engine-based power, a torque sensor output.

34. The control system of claim 22, wherein the operational information associated with a current operating state of the engine-based power system includes at least one value associated with emissions generated by the engine-based power system.

35. The control system of claim 22, wherein predicting a response of the engine-based power system includes running a simulation routine configured to model operational characteristics associated with at least one component of the engine-based power system.

36. The control system of claim 35, wherein the simulation routine includes a predictive model.

37. The control system of claim 35, wherein the simulation routine includes a physical simulation model configured to simulate at least one operation associated with the engine-based power system.

38. The control system of claim 37, wherein the at least one operation includes combustion occurring within one or more combustion chambers of the engine-based power system.

39. The control system of claim 37, wherein the at least one operation includes a flow of air through the engine-based power system.

40. The control system of claim 37, wherein the at least one operation includes a generation of emissions from the engine-based power system.

41. The control system of claim 32, wherein the engine-based power system is an HCCI engine-based power system.

42. The control system of claim 22, wherein the memory further includes instructions for homogeneously mixing fuel with air prior to combustion.

43. A machine, comprising:
an engine-based power system;
a memory including instructions for:
receiving performance information relating to a desired operating state for the engine-based power system,
evaluating operational information associated with a current operating state of the engine-based power system,
determining a single set of one or more control parameter values corresponding to a same time interval of power system operation, the single set of control parameter values based on the performance information and the operational information,
predicting a response of the engine-based power system based on the single set of control parameter values,
determining whether the response predicted based on the single set of control parameter values satisfies one or more desired performance characteristics associated with the engine-based power system,
enabling control of at least one component of the engine-based power system based on the one or more control parameter values if the response satisfies the one or more desired performance characteristics, and
if the predicted response does not satisfy the one or more desired performance characteristics, varying the one or more control parameter values to provide an updated set of control parameters and implementing the updated set of control parameters to control the at least one component of the engine-based power system; and
a processor configured to execute the instructions.

44. The machine of claim 43, wherein the engine-based power system is an HCCI engine-based power system.

45. The machine of claim 43, wherein the memory further includes instructions for homogeneously mixing fuel with air prior to combustion.

46. A method of controlling an engine-based power system, comprising:
establishing one or more desired operating characteristics for the engine-based power system;
determining one or more control parameters based on the one or more desired operating characteristics;
predicting a response of the engine-based power system based on the one or more control parameters;
modifying at least one of the control parameters in response to the predicted response; and
generating a combustion event using the at least one of the control parameters, the combustion event characterized by a substantially homogeneous combustion temperature throughout a combustion chamber of the engine-based power system;
wherein predicting a response of the engine-based power system includes running a simulation routine including a predictive model configured to model operational characteristics associated with at least one component of the engine-based power system; and
wherein the determining one or more control parameters is performed with a routine separate from the simulation routine.

47. The method of claim 46, further including:
controlling an engine in response to the at least one modified control parameter.

48. The method of claim 47, wherein the controlling the engine further includes:
controlling a subsequent combustion cycle.

49. The method of claim 46, wherein the one or more control parameters are associated with a subsequent combustion cycle.

50. The method of claim 49, wherein the predicted response is associated with the subsequent combustion cycle.

51. The method of claim 46, wherein the engine-based power system is an HCCI engine-based power system.

52. A control system for controlling an engine-based power system, comprising:
a memory including instructions for:
establishing one or more desired operating characteristics for the engine-based power system,
determining one or more control parameters based on the one or more desired operating characteristics,
predicting a response of the engine-based power system based on the one or more control parameters,
modifying at least one of the control parameters in response to the predicted response, and
generating a combustion event using the at least one of the control parameters, the combustion event characterized by a substantially homogeneous combustion temperature throughout a combustion chamber of the engine-based power system; and
a processor configured to execute the instructions;
wherein predicting a response of the engine-based power system includes running a simulation routine including a predictive model configured to model operational characteristics associated with at least one component of the engine-based power system; and
wherein the determining one or more control parameters is performed with a routine separate from the simulation routine.

53. The control system of claim 52, further including:
controlling the engine in response to the at least one modified control parameter.

54. The control system of claim 53, wherein the controlling the engine further includes:
controlling a subsequent combustion cycle.

55. The control system of claim 52, wherein the one or more control parameters are associated with a subsequent combustion cycle.

56. The control system of claim 55, wherein the predicted response is associated with the subsequent combustion cycle.

57. The control system of claim 52, wherein the engine-based power system is an HCCI engine-based power system.

* * * * *